Figure 1:

L. LIPPMANN.
PROCESS OF PREPARING BLACK PLATE.
APPLICATION FILED OCT. 6, 1913.

1,176,912.

Patented Mar. 28, 1916.

Witnesses.
Wm. I. Cohen
Emily V. Hauser.

Leo Lippmann Inventor
By his Attorneys
Ashley & Cohen

UNITED STATES PATENT OFFICE.

LEO LIPPMANN, OF BERLIN, GERMANY.

PROCESS OF PREPARING BLACK PLATE.

1,176,912.  Specification of Letters Patent.  Patented Mar. 28, 1916.

Application filed October 6, 1913. Serial No. 793,732.

*To all whom it may concern:*

Be it known that I, LEO LIPPMANN, a subject of the Emperor of Germany, and resident of Berlin, Germany, have invented certain new and useful Improvements in Processes of Preparing Black Plate, of which the following is a specification.

This invention relates to processes for preparing black sheet iron or steel for making articles therefrom having a paint or lacquer coating on one side.

Sheet iron articles hitherto placed on the market and especially tin boxes or canisters for containing fats, blacking, lacquers, varnishes, waxes, pastes, carbid, food products, etc., are usually coated with a coloring or varnish and printed with text or other matter on one side, while the interior side of the receptacle is not so coated.

In the employment of sheet iron in the form of so called black plate as found on the market and especially when the printing is done on high speed presses, it is found that the ink does not properly adhere and often smudges and is also liable to crack and fall off after it dries. The reason for this is that the surface of the metal is smoothly polished in consequence of the cold-rolling process to which it is subjected in its manufacture. For example, in the manufacture of sheet metal canisters for metal polish, blacking, and the like, the color is often rubbed off in the stamping operation, so that the articles have to be gone over by hand with brushes and colors before they can be sent out. On the other hand, the employment of non-cold rolled or unpolished metal will be disadvantageous because the metal would be uneven, undulating or wrinkled, since it is not stretched, and, therefore, cannot be used with advantage for the manufacture of articles such as above indicated. Moreover, the non-cold rolled metal by reason of not being stretched, comes in smaller sheets, and, therefore, its employment is comparatively uneconomical. Also the presence of a rough face in the interior of boxes or other articles for containing pasty substances is disadvantageous by reason of the adherence of the substance to the rough surface.

According to the present invention, a plate of black sheet iron or steel is employed which is polished or cold-rolled upon one side as formerly, whereas the other side that is used for coating and printing is left rough. In this way, the adhesion of the paint or lacquer to the exterior of the article is secured, while the interior surface which is contacted by the pasty material contained in the receptacle is smooth and offers no pores or recesses into which the pasty material can lodge and thus adhere to the interior of the receptacle. Moreover, by reason of the cold-rolling of the sheet iron or steel on one side, the same is stretched and is thus free of the unevenness above mentioned.

Figure 2:
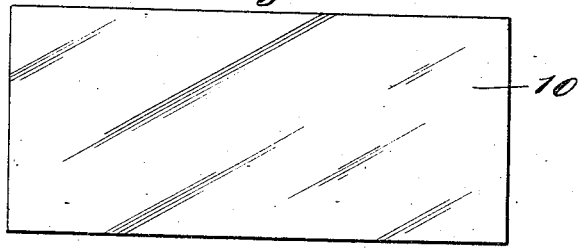

In the accompanying drawing illustrating this invention, Figure 1 is an elevation partly broken away of a canister made from the improved metal. Fig. 2 is a plan view of one side and Fig. 3 is a plan view of the other side of a plate of the improved black sheet iron or steel.

Figure 3:
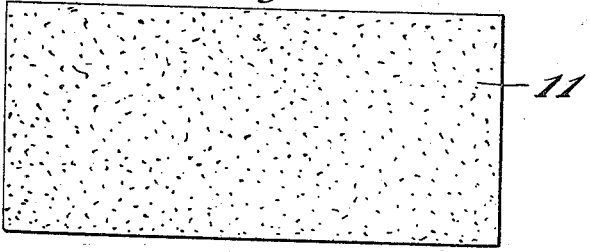

Referring particularly to Figs. 2 and 3, the improved sheet iron plate is provided at one side 10 with a smooth surface produced preferably by cold-rolling and the other side 11 is left rough as the sheet emerges from the hot rolling process. This may be obtained by putting the plates through the rolls two at a time, so that the outside faces of the plates are cold-rolled or polished, while the inside faces remain unpolished with the usual coating of oxid. This method is preferable as the rolling pressure to which the inside surfaces of the plates are thus subjected has the effect of somewhat flattening the grooves and closing the pores, so that the rough surface will absorb a smaller quantity of the coating. Another method may be resorted to for obtaining this result which consists in providing one of the rolls with a rough surface, as for example, by applying a coating or facing thereon, the rough material thus making this roll serve as a stretching roller and not as a cold-rolling or polishing roll. Another method consists in placing the sheet upon a table above which a cold-rolling or polishing roll is mounted. As the sheet and table move relatively to the roller, the face adjacent to the roll will alone be polished, whereas the under face not exposed to the roll remains rough.

In Fig. 1, I have illustrated a canister made of the improved sheet metal having a rough exterior surface 12 and a polished interior surface 13. The exterior surface is covered by a coating 14 which is printed with lettering 15. This coating and printing will adhere very firmly to the outer surface of the receptacle by reason of the roughness of the surface to which they are applied. On the other hand, the interior surface which is contacted by the contents of the canister is smooth and polished, constituting a surface to which pasty or other adhesive substances will not readily adhere.

Having thus described my invention, I claim as new and desire to secure by Letters Patent:

1. The process of preparing black plate for the manufacture of receptacles therefrom having a coating of paint or lacquer on the outside surface consisting in cold rolling or polishing one side of the plate only, leaving the other side unpolished with a coat of oxid thereon, and applying the coating to the unpolished side.

2. The process of preparing black plate for the manufacture of receptacles therefrom having a coating of paint or lacquer and characters on the outside surface consisting in cold rolling or polishing one side of the plate only, leaving the other side unpolished with a coat of oxid thereon and applying the coating to the unpolished side, and printing the desired characters on the coating.

Signed at Berlin, in the county of Brandenburg and State of Germany, this 11th day of September, A. D. 1913.

LEO LIPPMANN.

Witnesses:
WOLDEMAR HAUPT,
HENRY HASPER.